(12) United States Patent
Kamiya et al.

(10) Patent No.: US 7,722,113 B2
(45) Date of Patent: May 25, 2010

(54) INTERIOR PARTS FOR A VEHICLE

(75) Inventors: Kentaro Kamiya, Anjo (JP); Osamu Ito, Yokohama (JP); Takashi Goma, Nagoya (JP)

(73) Assignees: INOAC Corporation, Aichi (JP); Nissan Motor Co., Ltd., Kanagawa (JP); Hayashi Telempu Co., Ltd., Aichi (JP)

( * ) Notice: Subject to any disclaimer, the term of this patent is extended or adjusted under 35 U.S.C. 154(b) by 0 days.

(21) Appl. No.: 12/156,045

(22) Filed: May 29, 2008

(65) Prior Publication Data

US 2008/0296933 A1 Dec. 4, 2008

(30) Foreign Application Priority Data

May 31, 2007 (JP) .............................. 2007-145742

(51) Int. Cl.
 *B60R 21/04* (2006.01)
(52) U.S. Cl. ................................. 296/187.05; 296/1.08
(58) Field of Classification Search ............ 296/187.05, 296/193.06, 39.1, 1.08; 280/730.2, 751
 See application file for complete search history.

(56) References Cited

U.S. PATENT DOCUMENTS

| | | | | |
|---|---|---|---|---|
| 5,988,678 | A * | 11/1999 | Nakamura et al. ........... | 280/751 |
| 5,992,914 | A * | 11/1999 | Gotoh et al. ................ | 296/39.1 |
| 6,049,952 | A * | 4/2000 | Mihelich et al. .............. | 24/292 |
| 6,068,320 | A * | 5/2000 | Miyano ...................... | 296/39.1 |
| 6,079,732 | A * | 6/2000 | Nakajima et al. ......... | 280/728.2 |
| 6,095,591 | A * | 8/2000 | Matsuyama et al. .... | 296/187.05 |
| 6,126,231 | A * | 10/2000 | Suzuki et al. .......... | 296/187.05 |
| 6,145,908 | A * | 11/2000 | Deb et al. .................. | 296/39.1 |
| 6,309,011 | B1 * | 10/2001 | Matsuyama et al. .... | 296/187.05 |
| 6,315,350 | B1 * | 11/2001 | Nakane et al. ......... | 296/187.05 |
| 2006/0012220 | A1 * | 1/2006 | Luik et al. ............. | 296/187.05 |
| 2008/0197609 | A1 * | 8/2008 | Jaramillo et al. ......... | 280/730.2 |

FOREIGN PATENT DOCUMENTS

| | | |
|---|---|---|
| JP | H6-247199 | 9/1994 |
| JP | H7-179154 | 7/1995 |
| JP | H8-58507 | 3/1996 |
| JP | H8-91160 | 4/1996 |
| JP | H8-132874 | 5/1996 |
| JP | H8-164810 | 6/1996 |
| JP | H10-35373 | 2/1998 |
| JP | 10-310009 | 11/1998 |
| JP | 2000-3185463 | 11/2000 |
| JP | 2002-302003 | 10/2002 |
| JP | 2003-291760 | 10/2003 |
| JP | 2003-314515 | 11/2003 |
| JP | 2005-162201 | 6/2005 |

* cited by examiner

*Primary Examiner*—Jason S Morrow
(74) *Attorney, Agent, or Firm*—William L. Androlia; H. Henry Koda

(57) ABSTRACT

An interior part for a vehicle including a first rib(s) extending on the side that faces a vehicle body at a time of mounting the interior part to the vehicle body, and a second rib(s) extending to cross the first rib, in which an inserting portion(s) that is inserted into an opening(s) provided in the vehicle body is formed at portion(s) where the first rib and the second rib cross each other and projects toward the vehicle body, and this inserting portion(s) is provided with a third rib(s) that extends toward the vehicle body from the first rib and a fourth rib(s) that extends toward the vehicle body from the second rib.

11 Claims, 7 Drawing Sheets

INTERIOR PARTS FOR A VEHICLE

BACKGROUND OF THE INVENTION

1. Field of the Invention

The present invention relates generally to interior parts for a vehicle, which have a shock absorber equipped with a rib structure.

2. Description of the Related Art

A vehicle comes with various safety measures for passengers. In one safety measure as shown in FIGS. 6 and 7, for example, a pillar garnish 31, which is an interior part of a vehicle that covers a front pillar 10 of the vehicle body, is provided with a shock absorber 60 that has a rib structure.

The pillar garnish 31 is an elongated member bulging toward a passenger compartment 22 at its short-width directional cross section, and is attached to the front pillar 10 by clips 34. As shown in FIG. 7, the shock absorber 60 is provided in space D defined between the pillar garnish 31 and the front pillar 10. The shock absorber 60 includes a plurality of ribs 62 formed on the bottom of the pillar garnish 31, and fulfills FMVSS (Federal Motor Vehicle Safety Standards) 201 (hereinafter, called "Standard 201").

The shock absorber 60 with a rib structure takes various modes, such as the ribs 62 combined like a lattice as disclosed in Japanese Patent Application Laid-Open No. H10-310009, and the ribs 62 extending in the short-width direction of the pillar garnish 31 and aligned at intervals therebetween in the longitudinal direction as disclosed in Japanese Patent Application Laid-Open No. 2000-318543.

When an impact caused by an accident or the like is applied to the pillar garnish 31, the edges of the ribs 62 of the shock absorber 60 which face the front pillar 10 abut on the front pillar 10 and are supported thereby. At this time, impact force is further applied to the ribs 62 with the edges being supported by the front pillar 10, so that the ribs 62 are collapsed to absorb the impact. In other words, the ribs 62 should be configured so that the edge of each rib 62 is supported at the front pillar 10 even when an impact is applied to the hit point of the pillar garnish 31, which is defined by the Standard 201, from any direction defined by the Standard 201.

As another safety measure, as shown in FIG. 6 or 7, an airbag unit 70 which protects the head of a passenger may be installed at a portion extending from the front pillar 10 to a roof side 16 of the vehicle body as disclosed in, for example, Japanese Patent Application Laid-Open No. 2005-162201. The airbag unit 70 includes an airbag 72 accommodated in space D defined in the bottom of the pillar garnish 31 and a roof side garnish 18 or a roof lining 20, and an inflator (not shown) disposed at a lower portion of the front pillar 10. When a shock sensor detects an impact of a predetermined value or greater, the inflator is activated and the airbag 72 presses the interior part of the vehicle, such as the pillar garnish 31, deforming the interior part toward the passenger compartment 22. The airbag 72 is inflated to come out from the clearance between the interior part and the vehicle body by the deformation, and unfolded in the passenger compartment 22, covering the side window 24.

As shown in FIG. 7, the pillar garnish 31 provided with the shock absorber 60 that has a rib structure secures space for accommodating the airbag 72 between the front pillar 10 and the edges of the ribs 62 by way of lowering the height of the ribs 62. In this case, when an impact is applied to the hit point of the pillar garnish 31, which is defined by the Standard 201, in the short-width direction of the pillar garnish 31, the ribs 62 are not easily supported by the front pillar 10. In other words, the ribs 62 cannot receive the impact so that the entire pillar garnish 31 is displaced from the front pillar 10 as indicated by the two-dot chain lines in FIG. 7, disabling sufficient shock absorption.

The pillar garnish 31 is attached to the front pillar 10 by the clips 34 provided apart from each other on the inner side of the pillar garnish 31 in the longitudinal direction.

Another pillar garnish structure is disclosed in Japanese Patent Application Laid-Open No. 2005-162201 and FIG. 8 in which the engagement projections 36 provided on the bottom of the pillar garnish 31 are inserted into the engagement holes 12 provided in the front pillar 10 to prevent the pillar garnish 31 from coming off when the airbag is unfolded.

When the pillar garnish 31 receives impact in its short-width direction, the entire pillar garnish 31 is displaced in the short-width direction. Then, stress is concentrated on the engaging portions of the clips 34 and the engagement projections 36 with the front pillar 10, or the engagement-projections of the pillar garnish 31. However, because the clips 34 and the engagement projections 36 are not designed to take the force that acts in the short-width direction of the pillar garnish 31 into account, the clips 34 and the engagement projections 36 tend to be easily deformed or broken, and thus they do not contribute greatly to shock absorption.

SUMMARY OF THE INVENTION

Accordingly, it is an object of the present invention to provide an interior part for a vehicle which overcomes the inherent problem of the existing interior parts for a vehicle and further provide interior parts for a vehicle that is excellent in shock absorption.

The interior part for a vehicle according to the present invention is provided with an inserting portion, so that an excellent shock absorbing performance is demonstrated even when impact force is applied to the interior part from any direction where shock absorption is needed.

More specifically, the above object is accomplished by a unique structure of the present invention for an interior part for a vehicle that includes a first rib(s) extending on the side that faces a vehicle body at a time of mounting the interior part to the vehicle body, and a second rib(s) extending to cross the first rib, and in this structure:

an inserting portion(s) that is inserted into an opening(s) provided in the vehicle body is formed at portion(s) where the first rib and the second rib cross each other and projects toward the vehicle body, and the inserting portion(s) is provided with a third rib(s) that extends toward the vehicle body from the first rib and a fourth rib(s) that extends toward the vehicle body from the second rib.

DETAILED DESCRIPTION OF THE PREFERRED EMBODIMENT

Figure 6:
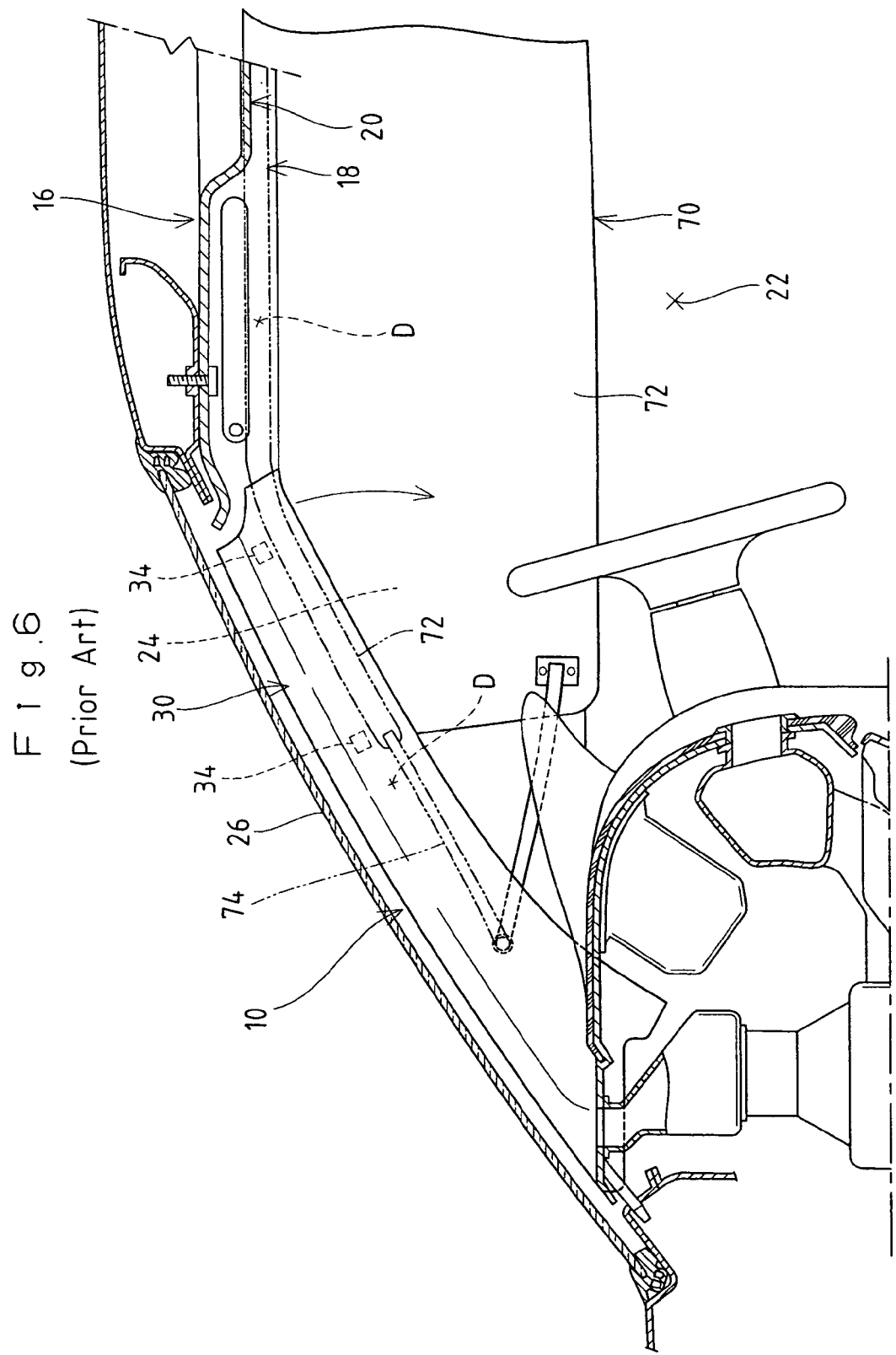
FIG. 6 is a partly cutaway schematic diagram showing a side portion of an ordinary vehicle viewed from the passenger compartment side.
Figure 7:
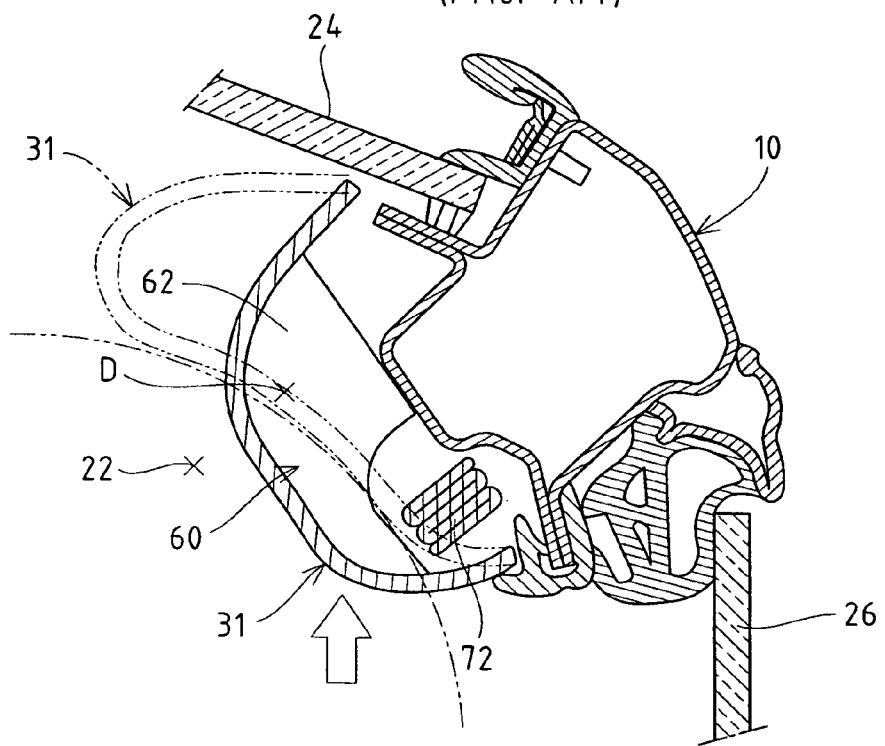
FIG. 7 is a lateral cross-sectional view showing the pillar garnish according to the related art mounted to the front pillar of a vehicle.
Figure 8:
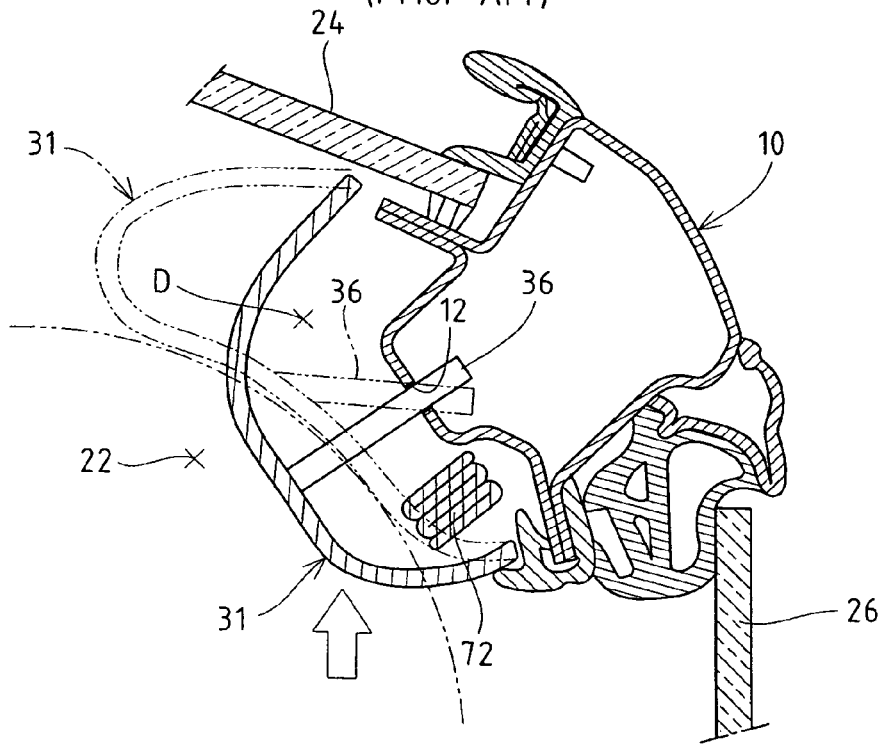
FIG. 8 is a lateral cross-sectional view showing another pillar garnish according to the related art mounted to the front pillar of a vehicle.

An interior part for a vehicle according to the present invention will now be described below referring to the accompanying drawings. To avoid-redundant descriptions, the same reference numerals are given to those elements which are the same as the corresponding elements of the front pillar and the airbag unit shown in FIGS. 6 to 8. As an interior part for a vehicle, a pillar garnish will be described below as an example; however, it is not restrictive. The interior part of the present invention has an outer side, it is the side that faces the passenger compartment at the time that the interior part is mounted to a vehicle body, and in the present invention, the "inner side" is the side that faces the vehicle body. Further, front and rear or up and down of the pillar garnish are the directions based on the state that the pillar garnish is attached to the front pillar of a vehicle.

Figure 1:
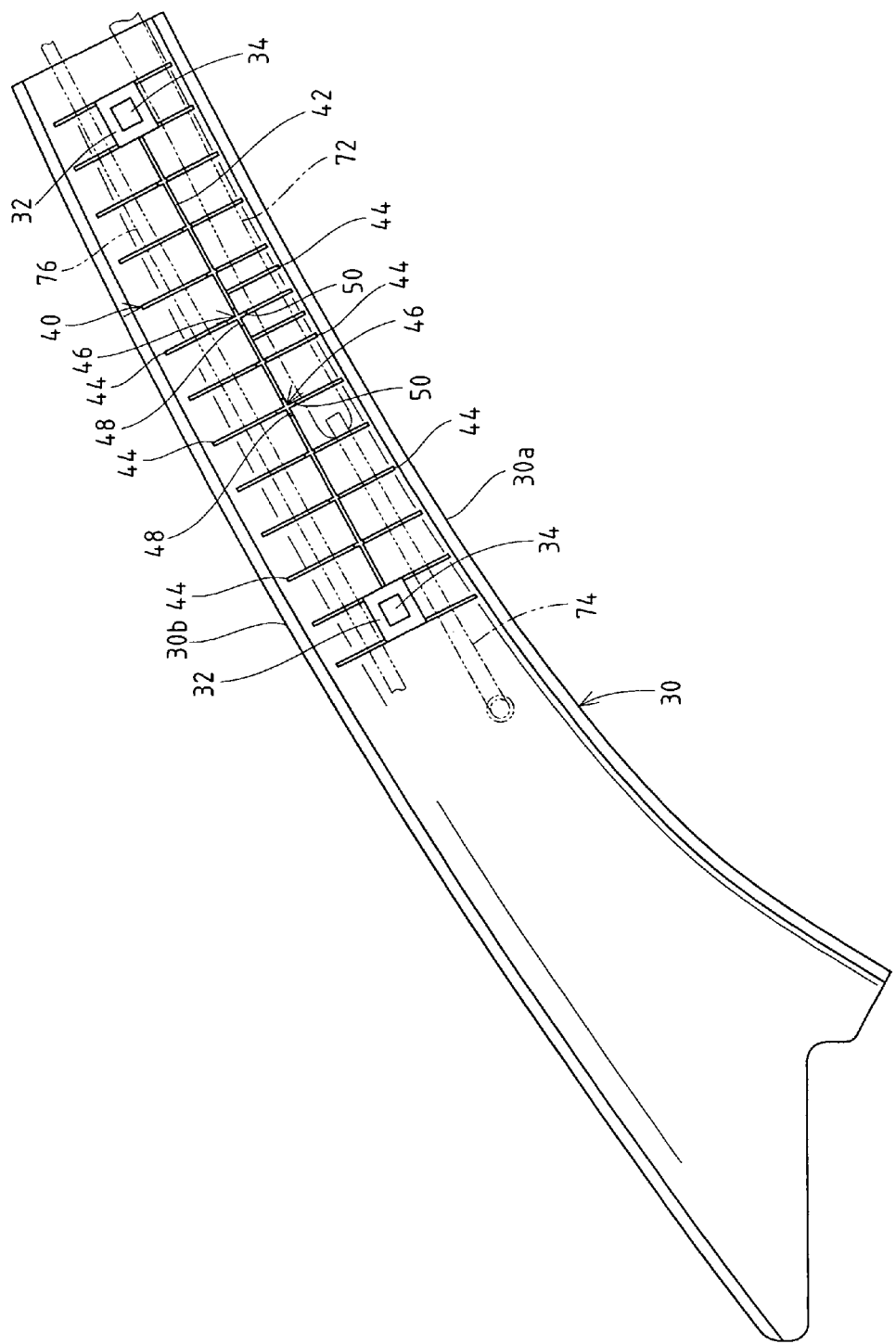
FIG. 1 is a bottom view showing a pillar garnish according to a preferred embodiment of the present invention.
Figure 2:
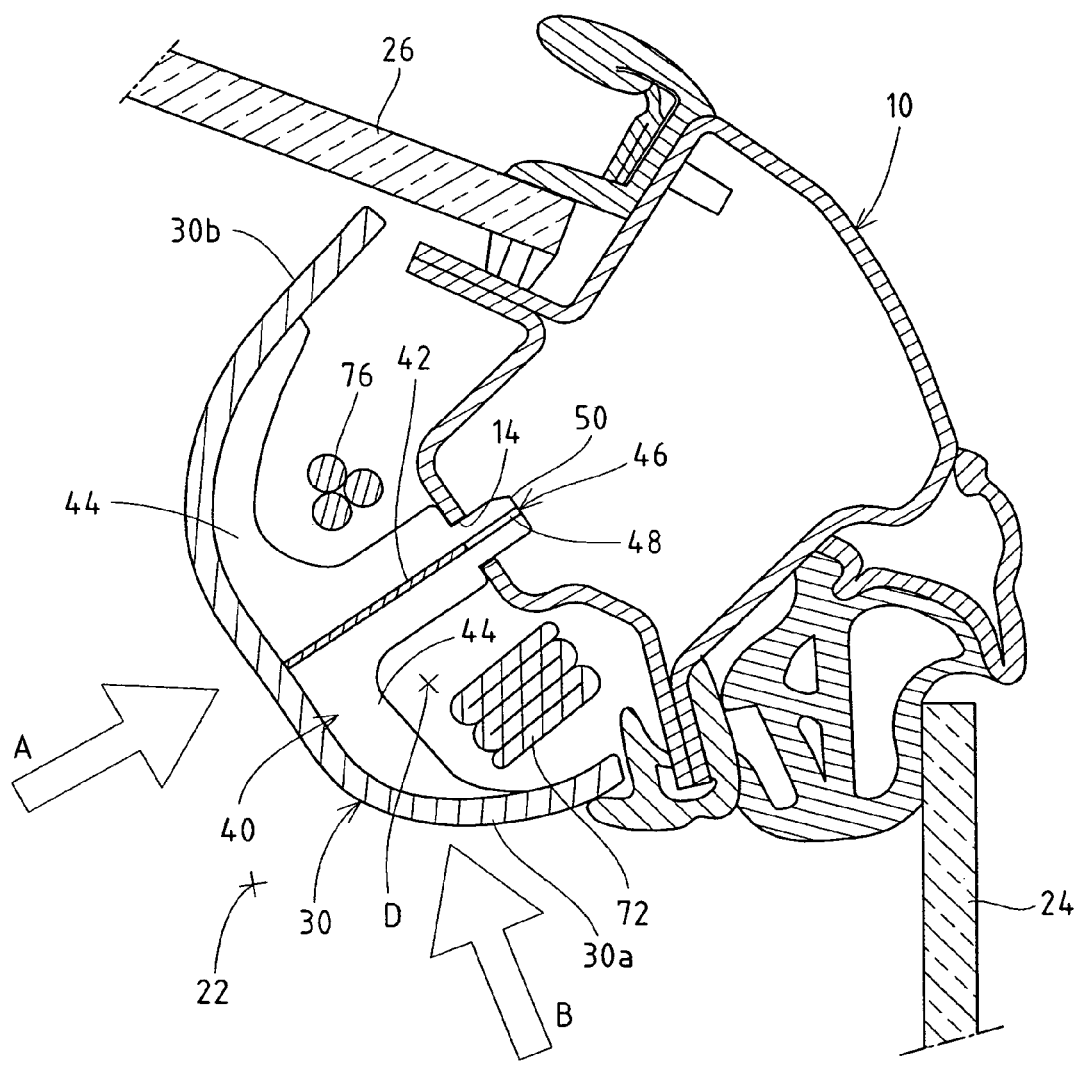
FIG. 2 is a lateral cross-sectional view showing the pillar garnish according to the embodiment mounted to the front pillar of a vehicle.
Figure 3:
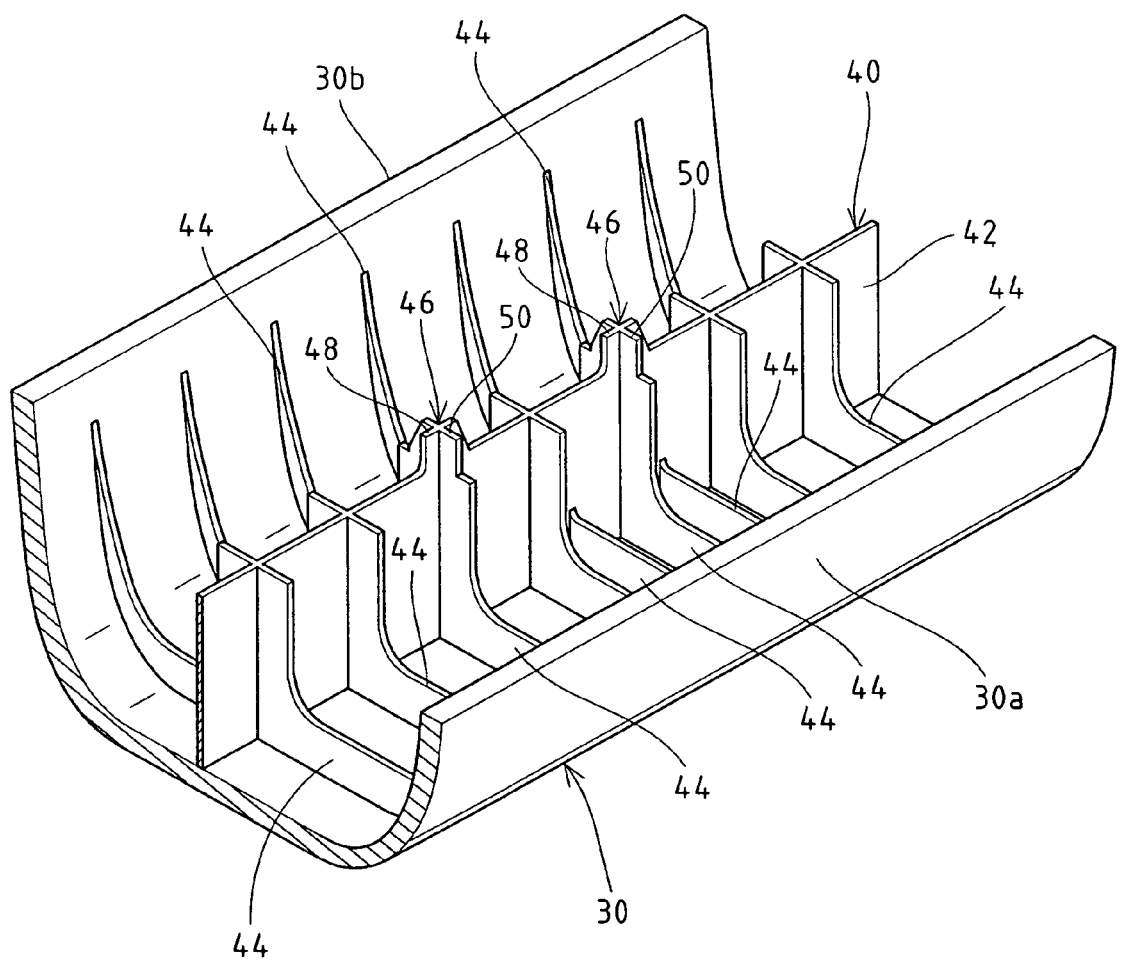
FIG. 3 is a schematic perspective view showing a part of the pillar garnish according to the embodiment.

As shown in the bottom view of FIG. 1, a pillar garnish 30 or an interior part for a vehicle of this invention is a molded member made of a synthetic resin such as polypropylene, and a shock absorber 40 is molded integrally at the same time as the molding of the pillar garnish 30 is performed. As shown in FIGS. 2 and 3, in this pillar garnish 30, its short-width directional cross section is curved so that the pillar garnish 30 has a shape of an elongated gutter capable of covering a front pillar 10. As shown in FIG. 1, clip bases 32 where clips 34 are respectively disposed are integrally formed on the inner side of the pillar garnish 30 so as to be apart from each other in the longitudinal direction. In the shown embodiment, the clip bases 32, 32 are formed at two locations in correspondence to the upper position and the middle position of the pillar garnish 30 when the pillar garnish 30 is attached to the front pillar 10. The shock absorber 40 is provided between the upper clip base 32 and lower clip base 32. The clip base 32 and the clip 34 may be formed integral with each other.

The shock absorber 40 includes a first rib 42 extending on the inner side of the pillar garnish 30, and second ribs 44 extending to cross the first rib 42. Inserting portions 46 are formed integrally at portions where the first rib 42 and the second ribs 44 cross each other in a cross shape. The first rib 42 and each second rib 44 are thin plate-like members formed integrally on the bottom of the pillar garnish 30. The thickness of each one of the ribs is set within a range of, for example, 0.5 mm to 2 mm according to the required shock absorbing performance.

The first rib 42 extends in the longitudinal direction of the pillar garnish 30 and is provided continuously between the upper clip base 32 and lower clip base 32. Each second rib 44 extends orthogonal to the first rib 42 in the short-width direction of the pillar garnish 30. The first rib 42 is provided approximately in the center of the pillar garnish 30 in the short-width direction. The dimension of the first rib 42 projecting from the bottom of the pillar garnish 30 is set equal to or shorter than the dimension from the mount position of the pillar garnish 30 to the front pillar 10. The first rib 42 and the second rib 44 in the embodiment are provided at right angles or approximately at right angles with respect to the bottom of the pillar garnish 30.

A plurality of second ribs 44 are disposed in parallel to one another at intervals therebetween in the longitudinal direction of the pillar garnish 30. The second ribs 44 are basically provided so as to extend between both side portions 30a, 30b of the pillar garnish 30 and to be orthogonal to the first rib 42 to form a cross shape. Some ribs 44 can be provided so as to extend between the first rib 42 and one side portion 30a of the pillar garnish 30 and to be orthogonal to the first rib 42 in a T shape as shown in FIG. 1.

As best seen from FIG. 3, some or all of the second ribs 44 formed between the first rib 42 and the rear side portion 30a (that is a portion positioned on the rear side of the vehicle when the pillar garnish 30 is attached to the front pillar 10) of the pillar garnish 30 are formed in such a way that the height of the ribs 44 from the bottom of the pillar garnish 30 is lower than the first rib 42. Accordingly, a space for accommodating an airbag 72 and an airbag support member 74 can be secured between the first rib 42 and the rear side portion 30a of the pillar garnish 30.

Furthermore, some or all of the second ribs 44 formed between the first rib 42 and the front side portion 30b (that is a portion positioned on the front side of the vehicle when the pillar garnish 30 is attached to the front pillar 10) of the pillar garnish 30 are likewise formed in such a way that the height of the ribs 44 from the bottom of the pillar garnish 30 is lower than the first rib 42. Accordingly, a space for accommodating a piping system 76, such as electric wires and pipes, can be secured between the first rib 42 and the front side portion 30b of the pillar garnish 30.

The cross shape and the T shape at the intersections of the first rib 42 and the second ribs 44 are the shapes when the pillar garnish 30 provided with the shock absorber 40 is seen from the inner side.

Each inserting portion 46 is provided at an intersection where the first rib 42 and the second rib 44 are orthogonal in a cross shape. As shown in FIGS. 2 and 3, the inserting portion 46 is formed to project toward the front pillar 10 from the intersection of the first rib 42 and the second rib 44, and it is formed so as to be integral with the first rib 42 and second rib 44. The inserting portion 46 in the embodiment has a cross shape formed by third ribs 48, which are provided to extend toward the front pillar 10 from the first rib 42, and fourth ribs 50, which are provided to extend toward the front pillar 10 from the second ribs 44. One or a plurality of inserting portions 46 are provided at a proper position or proper positions of the cross-shaped intersection of the first and second ribs 42 and 44. In the shown embodiment, two inserting portions 46 are provided between the upper clip base 32 and lower clip base 32. The cross shape formed by the third and fourth ribs 48 and 50 extends in the same direction as the cross shape formed by the first and second ribs 42 and 44.

Further, the inserting portion 46 is formed so that the intersection of the first rib 42 and the second rib 44 projects within a dimensional range needed for the required shock absorbing performance. Each third rib 48 extends from the first rib 42 within a range of about 7 mm with the intersection of the first and second ribs 42 and 44 in between. Each fourth rib 50 extends from each second rib 44 within a range of about 7 mm with the intersection of the first and second ribs 42 and 44 in between. Though, in the shown embodiment, the thickness of the third rib 48 is set equal to the thickness of the first rib 42, and the thickness of the fourth rib 50 is set equal to the thickness of the second rib 44. But those thicknesses may be changed.

The amount of projection of the inserting portion 46 from the edge of the first rib 42 is set to a dimension that is large enough for the projecting portion to be inserted into an opening 14 provided in the front pillar 10 when the pillar garnish 30 is attached to the front pillar 10. The shapes of both side portions of the third rib 48 may take any one of (i) a relation in which the both side portions are parallel to each other, (ii) an inclined relation in which they come closer to each other toward the distal ends, and (iii) a combination of those relations (i) and (ii). Likewise, the shapes of both side portions of the fourth rib 50 may take any one of (i) a relation in which the both side portions are parallel to each other, (ii) an inclined relation in which they come closer to each other toward the distal ends, and (iii) a combination of those relations (i) and (ii). The corner portions of the distal ends of the third rib 48 and the fourth rib 50 may be chamfered like an arc shape or a tapered shape.

The front pillar 10 is provided with engagement holes (not shown) formed respectively at a position corresponding to each clip bases 32 of the pillar garnish 30 so that the clips 34 disposed on the clip bases 32 are inserted into the engagement holes, respectively. Each one of the openings 14 provided in the front pillar 10 is for inserting therein the associated inserting portion 46, and it is provided at a position corresponding to each inserting portion 46 of the shock absorber 40. The opening 14 is circular shape and is large enough so that the inserting portion 46 is inserted tightly. The size of the each engagement hole is set smaller than the size of the maximum expanding portion of the clip 34, so that the clip 34 when inserted is engaged with the engagement hole and not easily pulled out therefrom.

The pillar garnish 30 with the structure described above is secured when each clip 34 placed on the clip base 32 is inserted in and engaged with the corresponding engagement hole of the front pillar 10 after each inserting portion 46 is inserted and positioned in the associated opening 14 (see FIG. 2). The airbag 72 or the airbag support member 74 is accommodated on the rear side of the first rib 42 so that it is in the space that is defined between a portion of the second rib 44 set lower than the first rib 42 and the front pillar 10 when the pillar garnish 30 is attached to the front pillar 10. The piping system 76 is accommodated in the space on the front side of the first rib 42.

Next, the action of the pillar garnish 30 according to the shown embodiment will be described below.

If an impact is applied to the pillar garnish 30, which is attached to the front pillar 10, in a direction toward (outward) the front pillar 10 from a passenger compartment 22 side as indicated by an arrow A in FIG. 2, the impact force acts in a direction substantially identical to the upright direction of the first rib 42 and second rib 44 and in the projecting direction of the inserting portion 46. At this time, the pillar garnish 30 deforms toward the front pillar 10 and, the edges of the first rib 42 and second rib 44 that face the front pillar 10 abut on the front pillar 10, so that the first rib 42 and second rib 44 are supported by the front pillar 10. Then, the first rib 42 and second rib 44 are collapsed, so that the impact is absorbed. Because the first rib 42 extends continuously in the longitudinal direction of the pillar garnish 30, a stable shock absorbing performance is demonstrated.

By way of contrast, if an impact is applied to the rear side portion 30a of the pillar garnish 30 in a direction toward a front window 26 from the passenger compartment 22 which is the frontward in the short-width direction as indicated by an arrow B in FIG. 2, the impact force acts in a direction intersecting the projecting direction of the inserting portion 46. When the ribs are not supported by the front pillar 10 so that the pillar garnish 30 is entirely displaced, the impact applied to the rear side portion 30a of the pillar garnish 30 is not absorbed effectively as mentioned in the foregoing description regarding the related art. However, in the shock absorber 40 of the present invention, since the inserting portion 46 is inserted in the opening 14 of the front pillar 10, the inserting portion 46 engages upon the impact the opening periphery of the opening 14, and the pillar garnish 30 is prevented from being displaced as a whole. More specifically, in the shock absorber 40 of the present invention, the force, which is applied to the rear side portion 30a of the pillar garnish 30 with the inserting portion 46 being engaged with the opening 14, acts on the first rib 42 to which the third rib 48 is coupled to and on the second rib 44 to which the fourth rib 50 is coupled to. In the pillar garnish 30, therefore, the third rib 48 and the fourth rib 50 deform to absorb the impact, and the first rib 42 and the second rib 44 also deform to absorb the impact; and as a result, effective shock absorption is ensured. Furthermore, in the pillar garnish 30, the inserting portion 46 inserted into the opening 14 of the front pillar 10 receives the impact applied to the rear side portion 30a of the pillar garnish 30, so that the front portion of the fourth rib 50 of the inserting portion 46 eats into the opening periphery of the opening 14, and thus the inserting portion 46 is prevented from coming off. This can restrain the pillar garnish 30 from being displaced inward or toward the passenger compartment 22 from the front pillar 10.

As mentioned above, the second rib 44 is provided with a portion where the rib height from the bottom of the pillar garnish 30 is set lower to define a space for accommodating the airbag 72, the airbag support member 74, the piping system 76 or the like. More specifically, when an impact is applied to the pillar garnish 30 from the rear side portion 30a, the edge of the second rib 44 which faces the front pillar 10 is not supported by the front pillar 10. Therefore, the shock absorbing performance of the second rib 44 itself is not sufficient for the impact applied from the rear side portion 30a of the pillar garnish 30. In the pillar garnish 30 according to the embodiment, however, the inserting portion 46 is engaged with the opening 14 and supported by the front pillar 10 when a force is applied to the front pillar 10 in a direction intersecting the projecting direction of the inserting portion 46; as a result, the pillar garnish 30 can sustain the impact. Even if there are fewer second ribs 44 or the dimensions thereof are small, therefore, the shock absorbing performance of the shock absorber 40 can be supplemented by the inserting portion 46. The shock absorber 40 can therefore demonstrate, as a whole, adequate shock absorbing performance with respect to the impact applied from the rear side portion 30a of the pillar garnish 30.

The inserting portion 46 of the shock absorber 40 is formed not independently of the first rib 42 and the second ribs 44 but integrally formed with the intersections of the first rib 42 and the second ribs 44 and projects toward the front pillar 10. In addition, the third rib 48 and the fourth rib 50 constituting the inserting portion 46 are coupled to each other in a cross shape and configured to respectively extend from the first rib 42 and the second rib 44, and all the ribs are in a continual fashion. In other words, since each rib supports another rib, the shock absorbing performance of the shock absorber 40 is higher as compared with the structure in which the inserting portions 46 are provided individually.

The force that acts on the inserted portion of the inserting portion 46 inserted into the opening 14 when the impact is applied to the rear side portion 30a of the pillar garnish 30 is distributed to the first rib 42 and second rib 44 that are continuous to the third rib 48 and the fourth rib 50. This makes the inserting portion 46 hard to be broken at the inserted portion and improves the shock absorbing performance. Further, the provision of the inserting portion 46 at the cross-shaped intersection of the first and second ribs 42 and 44 can allow the first rib 42 and the second rib 44 to deform when an impact is applied to the rear side portion 30a of the pillar garnish 30, so that stable shock absorbing performance can be provided.

As described above, the first rib 42, the second rib 44 and the inserting portion 46 (third rib 48, fourth rib 50) of the shock absorber 40 are integrally formed and continuous to one another. More specifically, even when an outward impact or frontward impact is applied to the pillar garnish 30, stress is applied to the first rib 42, the second rib 44 and the inserting portion 46, so that the first rib 42, the second rib 44 and the inserting portion 46 each deforms to absorb the impact. The pillar garnish 30 according to the embodiment, as a result, shows a required shock absorbing performance for the hit point of the pillar garnish 30, which is defined by the Standard 201, in any directions demanded by the Standard 201.

As is apparent from the above, with the presence of the inserting portion 46, the shock absorber 40 according to the present invention as a whole provides a required shock absorbing performance against the impact applied to the pillar garnish 30 even when the second ribs 44 are set lower. In other words, the pillar garnish 30 that includes the shock absorber 40 of the present invention can share the pillar garnish 30 not only in a type provided with the airbag 72 but also in a type not provided with the airbag 72. This makes it possible to reduce the kinds of parts, contributing to the cost reduction.

The above-described embodiment can be modified as follows.

(1) After the shock absorber is molded separately from the pillar garnish, the shock absorber may be connected to the pillar garnish by ultrasonic welding, an adhesive or the like. The separate molding of the shock absorber from the pillar garnish provides an advantage that the degree of freedom of the shape of the shock absorber is increased.

(2) The shock absorber may be provided in a roof side garnish or a roof lining that are the interior parts of a vehicle disposed on the roof side of a vehicle body, or in any other interior part of a vehicle which a passenger is likely to make physical contact with.

(3) While the first rib and the second rib according to the embodiment are configured to be provided upright at set positions from the bottom at right angles or approximately right angles, the upright direction of the ribs may be set in the direction in which an impact is applied to the interior part of a vehicle. In this case, there is an advantage that each rib demonstrates more effective shock absorbing performance.

(4) The cross shape in the present invention is not limited to a structure in which the first rib and the second rib are orthogonal, and it also includes a structure in which the first rib and the second rib cross each other obliquely.

(5) Although the opening formed in the front pillar is circular in the shown embodiment, the opening may take any other shape, such as a square shape, as long as the inserting portion can be inserted.

(6) Although the height of the second rib is set lower than the height of the first rib in the shown embodiment, the heights of the first rib 42 and the second rib may be set identical to each other.

(7) The inserting portion is provided at the cross-shaped intersection of the first rib and the second rib in the embodiment described above. The inserting portion may, however, be provided at a Y-shaped intersection where one of the first rib and the second rib is bent and the other is connected to this bent portion. Further, the inserting portion may be provided at a portion where the first rib and the second rib intersect each other in an L shape, a T shape and so on.

(8) Another structure is also applicable wherein a cushion member, such as a non-woven cloth or resin cap, is provided at the inserting portion, so that when the inserting portion is inserted into the opening 14 of a vehicle body, the inserting portion come in contact with the inside edge of the opening via the cushion member. The provision of the cushion member at the inserting portion can prevent the inserting portion inserted into the opening from directly contacting the inside edge of the opening 14 in the vehicle body and suppress the occurrence of noise caused by vibration or the like while the vehicle is running.

Figure 4:
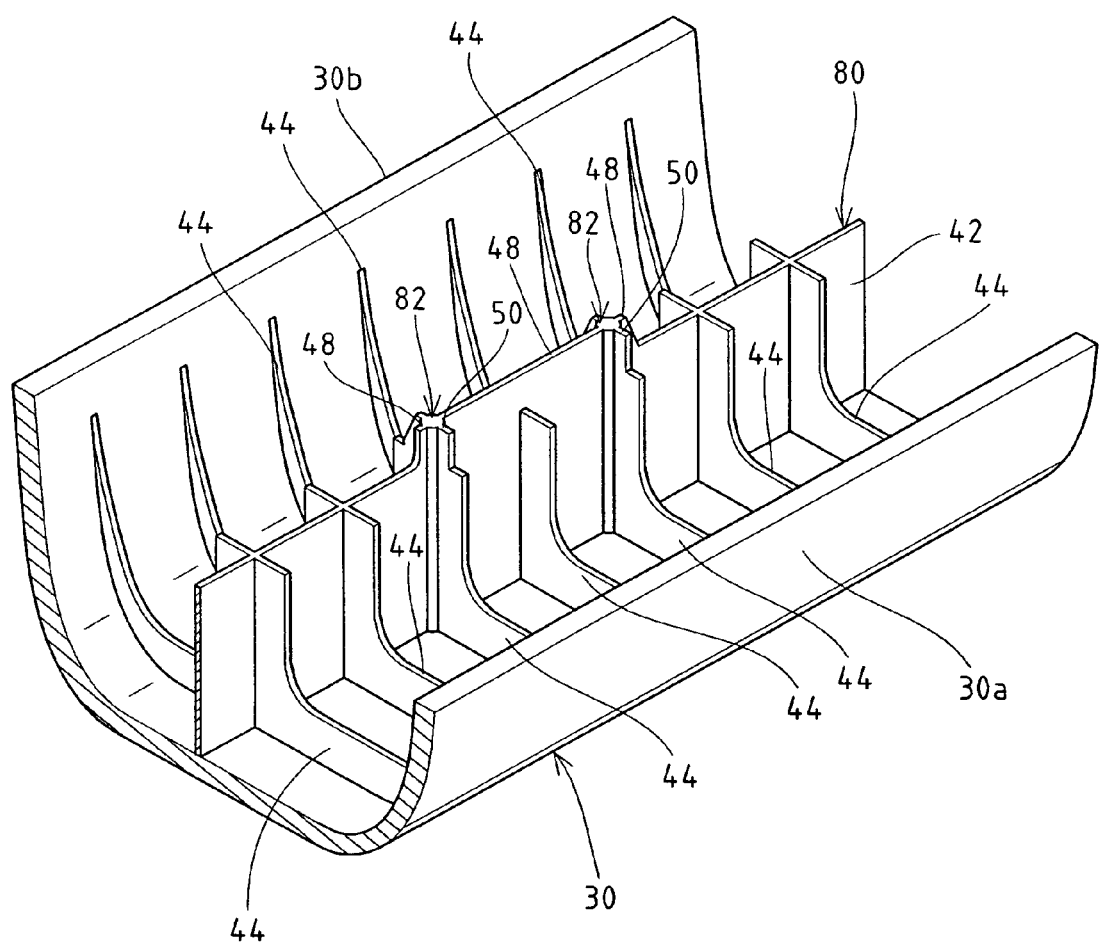
FIG. 4 is a schematic perspective view showing a part of the pillar garnish according to a modification of the structure shown in FIG. 1.

(9) Although the shock absorber according to the embodiment has a cross-shaped intersection formed by the first rib and the second rib, as shown in FIG. 4, a shock absorber 80 may have a modified shape in which the corner portion formed by the first rib 42 and the second rib 44 is buried in an arc shape. In the shock absorber 80 according to this modification, an inserting portion 82 is formed at an intersection of the first rib 42 and the second rib 44; and at this intersection, the inserting portion 82 can be formed with (1) a cylindrical portion projecting toward the front pillar (vehicle body) 10 from the first rib 42 and the second rib 44, (2) a third rib 48 which is continuous to the first rib 42 and extending along the cylindrical portion, and (3) a fourth rib 50 which is continuous to the second rib 44 and extending along the cylindrical portion. The third ribs 48 may be configured so that it is linked between the adjoining inserting portions 82 and 82 and formed integrally.

Figure 5:
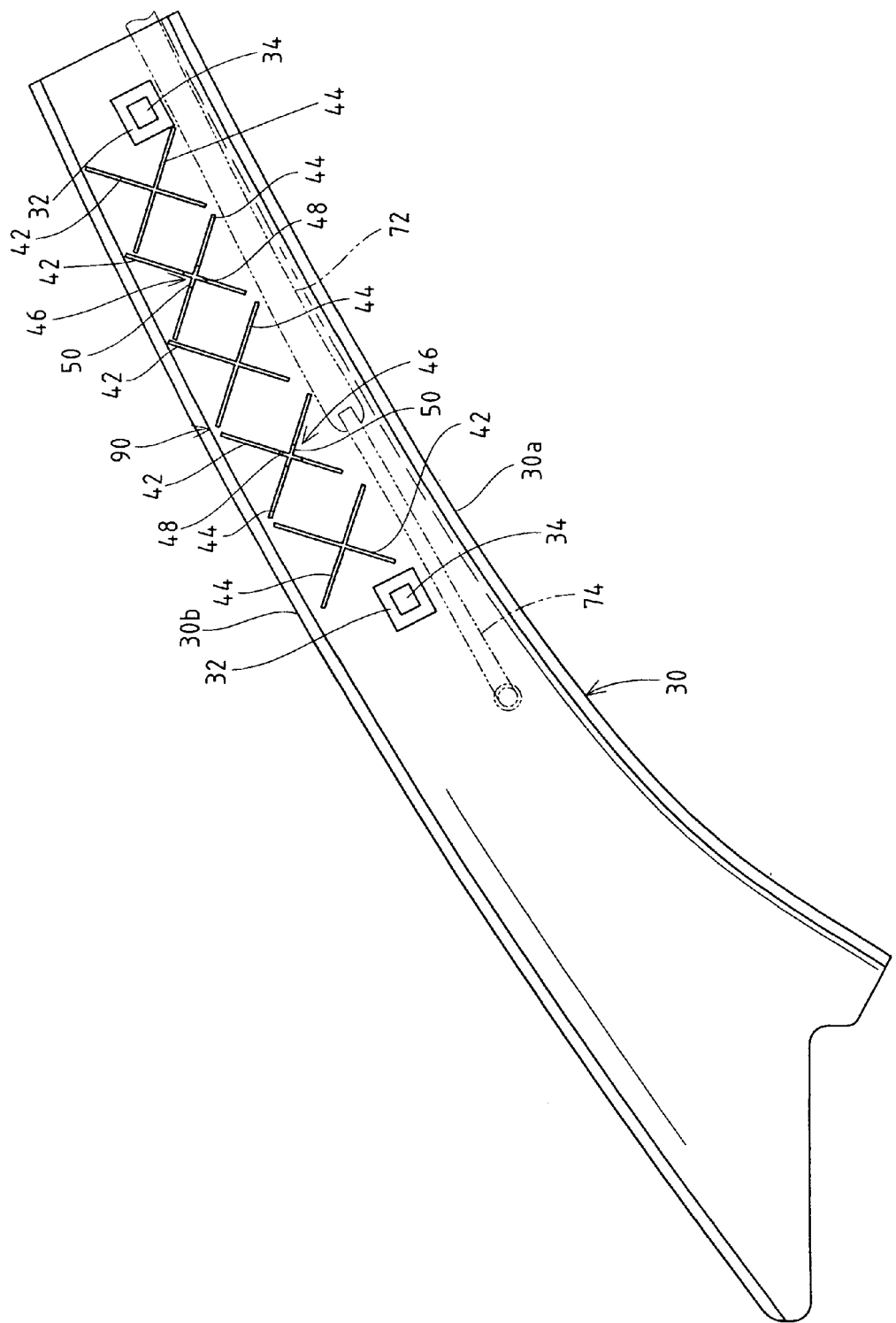
FIG. 5 is a bottom view showing a pillar garnish according to another modification.

(10) In the above-described embodiment, the first rib extends in the longitudinal (lengthwise) direction of the pillar garnish and the second rib extends in the width direction of the pillar garnish. However, the first rib 42 may extend in a direction intersecting the longitudinal direction of the pillar garnish 30 as in a shock absorber 90 according to another modification shown in FIG. 5. In this shock absorber 90, the second rib 44 extends in a direction that the second rib intersects the first rib 42. The shock absorber 90 in another modification may take a structure that the end portion of the first rib 42 is connected to the end portion of the second rib 44, so that the first ribs 42 and the second ribs 44 are continuous in a polygonal line shape.

What is claimed is:

1. An interior part for a vehicle having a first rib extending on a side that faces a vehicle body at a time of mounting the interior part to the vehicle body, and a second rib extending to cross the first rib, wherein:
    an inserting portion is formed projecting toward the vehicle body at a portion where the first rib and the second rib cross each other, the inserting portion being inserted in an opening formed in the vehicle body, and
    the inserting portion is provided with a third rib continuously extending toward the vehicle body from the first rib and a fourth rib continuously extending toward the vehicle body from the second rib.

2. The interior part according to claim 1, wherein the inserting portion is formed at a portion where the first rib and the second rib cross each other in a cross shape.

3. The interior part according to claim 2, wherein the inserting portion has a cross shape where the third rib and the fourth rib cross each other.

4. The interior part according to claim 1, wherein the first rib and the second rib are integrally formed on a side that faces the vehicle body.

5. The interior part according to claim 1, wherein the first rib continuously extends in a longitudinal direction of the interior part.

6. The interior part according to claim 1, wherein
the first rib and the second rib are integrally formed on a side that faces the vehicle body, and
the inserting portion is formed at a portion where the first rib and the second rib cross each other in a cross shape.

7. The interior part according to claim 1, wherein
the first rib continuously extends in a longitudinal direction of the interior part, and
the inserting portion is formed at a portion where the first rib and the second rib cross each other in a cross shape.

8. The interior part according to claim 1, wherein
the first rib and the second rib are integrally formed on a side that faces the vehicle body, and
the inserting portion is formed at a portion where the first rib and the second rib cross each other in a cross shape, and has a cross shape where the third rib and the fourth rib cross each other.

9. The interior part according to claim 1, wherein
the first rib continuously extends in a longitudinal direction of the interior part, and
the inserting portion is formed at a portion where the first rib and the second rib cross each other in a cross shape, and has a cross shape where the third rib and the fourth rib cross each other.

10. The interior part according to claim 1, wherein
the first rib and the second rib are integrally formed on a side that faces the vehicle body, and
the first rib continuously extends in a longitudinal direction of the interior part.

11. The interior part according to claim 1, wherein
the first rib and the second rib are integrally formed on a side that faces the vehicle body,
the first rib continuously extends in a longitudinal direction of the interior part, and
the inserting portion is formed at a portion where the first rib and the second rib cross each other in a cross shape, and has a cross shape where the third rib and the fourth rib cross each other.

\* \* \* \* \*